(12) United States Patent
Mawardi

(10) Patent No.: US 6,711,422 B2
(45) Date of Patent: Mar. 23, 2004

(54) THIN FILM SUPERCONDUCTING SYNCHRONOUS MOTOR

(76) Inventor: Osman K. Mawardi, 15 Mornington La., Cleveland Heights, OH (US) 44106

(*) Notice: Subject to any disclaimer, the term of this patent is extended or adjusted under 35 U.S.C. 154(b) by 119 days.

(21) Appl. No.: 09/953,840

(22) Filed: Sep. 17, 2001

(65) Prior Publication Data

US 2003/0052554 A1 Mar. 20, 2003

(51) Int. Cl.⁷ .................. H02K 55/00; H02K 55/04
(52) U.S. Cl. .................. 505/166; 505/120; 310/52; 310/54; 310/261
(58) Field of Search .................. 310/52, 54, 55, 310/58, 261, 211, 212; 505/120, 166

(56) References Cited

U.S. PATENT DOCUMENTS

| | | | |
|---|---|---|---|
| 3,875,435 A | * 4/1975 | Fletcher et al. | 310/40 R |
| 3,916,229 A | * 10/1975 | Litz et al. | 310/52 |
| 4,037,123 A | * 7/1977 | Mole et al. | 310/52 |
| 4,176,291 A | * 11/1979 | Rabinowitz | 310/52 |
| 4,238,715 A | 12/1980 | Parsch et al. | |
| 4,862,023 A | 8/1989 | Laumond et al. | |
| 5,177,054 A | * 1/1993 | Lloyd et al. | 505/166 |
| 5,325,002 A | * 6/1994 | Rabinowitz et al. | 505/166 |
| 5,482,919 A | * 1/1996 | Joshi | 310/52 |
| 6,025,769 A | 2/2000 | Chu et al. | |

OTHER PUBLICATIONS

Leonard, A., Arch. Elektrotech. vol. 52, (4) pp. 373–385, 1969.
Brechna, H. and Kronig, H., IEEE Trans., vol. MAG–15, pp. 715–718, 1979.
Mawardi, O.K., IEEE Trans. vol. MAG–23, 587, 1987.
Lipo. T.A., Electr. Mach. Power Syst. vol. 13, (6), pp. 373–385, 1987.
DeDonder, R. and Novotmy, D.W., Electr. Mach. Power Syst. vol. 13, (5), pp. 329–345., 1987.
Tubbs, S.P., IEEE Proc. vol. 137, Pt. B, pp. 120–124, 1990.
Wipf, S.L., Cryogenics vol. 32, pp. 936–948, 1991.

* cited by examiner

*Primary Examiner*—Karl Tamai
*Assistant Examiner*—David W. Scheuermann
(74) *Attorney, Agent, or Firm*—Quarles & Brady LLP; Alexander M. Gerasimow

(57) ABSTRACT

An superconducting electric motor is operated as a traditional squirrel-cage induction motor until the rotor reaches synchronous speed, at which point a current is trapped in a superconducting film by heating a portion of the superconducting film above its critical temperature, allowing the magnetic field generated by the stator coils to penetrate into the superconducting material and to induce a current. The superconducting material is then allowed to cool down below its critical temperature, thus trapping the current and allowing the motor to operate as a synchronous motor utilizing the magnetic field created by the direct current circulating in the superconducting material.

20 Claims, 5 Drawing Sheets

THIN FILM SUPERCONDUCTING SYNCHRONOUS MOTOR

BACKGROUND OF THE INVENTION

The field of the invention is superconducting motors and specifically squirrel cage motors that use superconductors. Superconductors are used for the purpose of increasing the power rating per unit weight of the motor and of reducing the electric Ohmic losses in the motor windings. Both of the latter improvements contribute to increasing the commercial value of the motor.

The early generation of superconducting rotating machines was restricted mostly to synchronous motors and alternators. Both of these machines require for their operation a fixed magnetic field generated by circulating a direct current in coil windings in the rotor which is connected to an external current source. The advantage of using superconductors in the rotor coil is to produce very high magnetic fields, considerably higher than can be generated by coil windings set in magnetic laminations. As a result, the synchronous motors and alternators are more compact and extremely efficient.

Synchronous electric motors employ a fixed magnetic field generated by the rotor acted upon by a rotating magnetic field created by the stator coils. The stationary magnetic field on the rotor constantly tries to align itself with the rotating magnetic field produced by the stator, causing the rotor to rotate and produce mechanical torque. Unfortunately, synchronous motors cannot operate at variable speeds and they are not self-starting. To obviate the two aforementioned drawbacks of the synchronous motor, direct current motors with superconducting field windings in the stator and conventional rotor coils with commutators were constructed and operated successfully.

The reason superconducting synchronous and direct current motors were the only superconducting electric motors to have been developed, so far, is due mainly to the limitations imposed by the properties of the commercially produced superconducting wires. There are two types of superconducting wires: the low temperature superconducting wires (LTS) and the high temperature superconducting wires (HTS). The low temperature hard superconductors, made of alloys of metals such as Nb and Ti, must be cooled down to temperatures below 10 degrees Kelvin for the material to be in the superconducting state. To ensure the stable operation of the LTS superconductor, the wire is made of many fine Nb-Ti strands, six microns in diameter, and embedded in a tube of copper. The other class of superconductors, made of alloys of earth metals (such as the so-called YBCO compounds) exhibit superconductivity at temperatures below 90 degrees Kelvin. The material, however, is very brittle. In order to shape it in the form of a long wire, it is encased in a silver tube and the whole matrix is extruded.

When an alternating current is caused to circulate in either class of wires (LTS or HTS) eddy currents are induced in the body of copper or silver. These secondary eddy currents lead to excessive Ohmic losses which will heat the superconductors and cause them quench (i.e. lose their superconducting property). This parasitic heating effect has discouraged the use of commercially available superconducting wires in motors excited with alternating current.

Because of recent advances in power electronics, alternating current drive systems have become a viable alternative to direct current motors for variable speed applications. Therefore there is a great deal of interest in searching for new methods of constructing superconducting alternating current motors that would incorporate two desirable features: the ability to exploit the attractive properties of available electronic power drives presently used with conventional alternating current motors and the use of HTS conductors. The HTS conductors require low cost liquid Nitrogen coolant and much simpler and more economical refrigeration systems that do LTS conductors.

The physics of the superconducting state are such that a superconducting ring behaves as a perfect diamagnetic body. Consequently, a current cannot be induced in a closed loop of superconducting material by using a moving magnetic field because the magnetic field cannot penetrate the superconducting loop. Conversely, if a magnetic flux had already penetrated a superconducting ring, the magnetic flux is frozen-in and cannot be destroyed.

The freezing of magnetic flux in a closed loop has been exploited by several inventors in different applications. Rabinowitz (U.S. Pat. No. 5,325,002) proposed to induce a current in a circuit of superconducting material that is above the critical temperature and therefore in the normal state. Once the current is induced, the circuit is then cooled to below its critical temperature at which time the material switches to the superconducting state and the circuit becomes a permanent electromagnet. A serious drawback of the Rabinowitz concept, if applied to the rotating field coils of a synchronous motor, is the significant amount of time it takes to cool the entire superconducting coil and its support. The long time constant renders the control of the motor completely impractical.

An extension of the Rabinowitz concept was applied by Leonard (1969), by Brechna and Kronig (1978), by Lipo (1987), by DeDonker and Novotny (1987) and by Tubbs (1990) to the construction of a synchronous/induction motor. This is a motor that is started as an induction motor and subsequently, when the rotor approaches the synchronous speed, the motor mode of operation is converted to that of a synchronous motor. In all of the above-mentioned motors, two sets of coils are installed on the rotor. The conductors of the first set are placed deep in the slots of the rotor laminations. The set of coils, made of superconducting wire, are inserted in the same slots and on top of the first set. When the motor is started all coils are at a temperature above critical. Because the Ohmic resistance of the superconducting coil at a temperature above critical is much higher than that of the non-superconducting first coil, upon starting the first coil carries most of the current and is responsible for the production of torque. Once the motor reaches the synchronous speed, the rotor is cooled to below critical temperature. As the second, superconducting coil is cooled, its resistance continually drops and a greater share of the current is transferred to it. Upon reaching superconductivity, the magnetic flux linking the coil becomes trapped in the coil and the motor behaves now as a synchronous motor.

All models of superconducting synchronous/induction motors constructed so far have displayed a disappointing performance because of two drawbacks. The first is due to the losses in the conductors. These consist of eddy current losses in the copper (or silver) matrix in the superconductor. The other drawback is the very long cooling time of the superconducting coil, which makes it impossible to alter the current in the coil while the motor is running in the synchronous mode.

It is possible, however, to induce a current in a circuit that is already below its critical temperature by creating a gap in the circuit to allow the magnetic field to penetrate the circuit.

Once a current is produced in the circuit, the gap is closed and the current will continue to circulate indefinitely as long as the circuit remains superconducting. Furthermore, the Ohmic losses in the superconductor can be reduced or eliminated if the thermal stability of the conductors can be improved by proper shaping of the superconductors.

BRIEF SUMMARY OF THE INVENTION

The present invention solves the two main problems that arise from the use of superconductors in the rotor of a synchronous electric motor. First, rather than incurring the costs and complexity involved in forming HTS coils, this motor uses superconducting material deposited in a thin film on the outer surface of a rotor of insulating material. The use of superconductors in the form of thin films removes the need for sheaths of copper of silver to provide mechanical integrity and added heat capacity. With the absence of the sheath, eddy currents are no longer generated in the conductors and with it the Ohmic losses that are the one serious drawback to the use of superconductors with alternating current.

Second, this motor induces a current in the superconducting material after it has been cooled to below its superconducting temperature by creating a gap in the circuit, although it creates this gap without using a mechanical switch. Instead, this motor raises the temperature of a small portion of the superconducting material so that is no longer superconducting. This heated portion then becomes the "gap" in the circuit that allows a current to be induced. The heated portion has a heat capacity that is a very small fraction of the total heat capacity of the rotor. As a result, the "opening" and "closing" of the gap takes place in milliseconds, an interval of time more than sufficient for regulating the current in the rotor.

Specifically, the present invention provides a conventional stator winding in a configuration well known in the art. Located inside the stator is a cylindrical rotor whose outer surface is covered by a thin film of superconducting material. Imbedded within the rotor or otherwise connected to it is an auxiliary squirrel cage composed of a non-superconducting material or other motor that is used to provide startup torque to bring the rotor to a synchronous speed. The present invention also contains a provision to cool the superconducting material to a critical temperature below which it becomes superconducting, and a heating device to raise a portion of the superconducting material to a temperature above its critical temperature once the rotor is at the synchronous speed.

It is thus one object of the invention to fix a magnetic field in a rotor that is already largely precooled to superconducting temperatures and to generate a magnetic field that rotates around the axis of the rotor by exciting the stator winding with an AC current. The formation of a rotating magnetic field in a stator winding is well known in the art and is a component of a conventional non-superconducting synchronous motor.

The thin film of superconducting material does not cover the entire outer surface, but instead is deposited in a pattern resembling a traditional squirrel cage rotor, with bars of superconducting material parallel to the axis of rotation that are joined at both ends by rings of superconducting material around the circumference of the rotor cylinder. The surface configuration of the superconducting material in the shape of a squirrel cage allows the current to circulate in loops around the squirrel cage, thus creating a fixed magnetic field whose number of poles is dictated by the number of bars in the surface squirrel cage. It is thus an object of the invention to eliminate the need to form superconducting material into thin wires. This would save considerable cost and complexity in the manufacture of superconducting motors.

Surrounding the central shaft are several layers of iron laminations. Imbedded in these laminations is a conventional squirrel cage rotor coil composed of a non-superconducting material. The purpose of this conventional squirrel cage is to produce start-up torque as described below. It is thus one object of the invention to make as compact a motor as possible by imbedding the auxiliary squirrel cage in the rotor.

Firmly bonded to the iron laminations is a cylindrical ceramic shell. This shell provides a base for the thin film of superconducting material. The superconducting film is not deposited directly on the ceramic shell, however. Instead, a substrate is applied in a thin layer on the surface of the ceramic shell. The purpose of the substrate is to provide a surface structure that is compatible with the superconducting material. In the preferred embodiment of the invention, this substrate consists of compounds such as zirconia ($ZrO_2$).

In the preferred embodiment of the present invention, the device for heating the superconducting material is a laser that can be pulsed on to provide a short burst of energy. This laser can be located within the stator winding or it can be located external to the stator winding with a length of fiber-optic cable providing a means to focus the laser beam on the rotor. It is thus one object of the invention to provide a simple means for heating a small portion of a rotating rotor that can be switched synchronously with the AC drive.

The operation of this motor was designed to reduce the amount of complexity normally associated with superconducting motors. First, the rotor is cooled so that the thin film becomes superconducting. Then, a rotating magnetic field is generated in the stator coils by exciting them with AC currents. This rotating magnetic field cannot "link" with the superconducting material because of the diamagnetism of the superconducting material. However, this rotating magnetic field induces a current in the auxiliary squirrel cage that is composed of normal conducting material and imbedded within the iron laminations of the torque tube. This induced current generates its own magnetic field that interacts with the stator field to produce rotation in the rotor. At this point, the motor is acting as a traditional squirrel cage induction motor. As the rotor approaches synchronous speed, a portion of one of the "bars" of the superconducting squirrel cage is heated so that it is no longer superconducting. The formation of this resistive spot on the squirrel cage creates a gap in the superconducting circuit and allows the magnetic field to penetrate the circuit. The heated spot is then allowed to cool back down and the current is then trapped in the superconducting squirrel cage. This trapped current creates a permanent magnetic field in the rotor and the motor then operates as a synchronous motor.

The foregoing and other objects and advantages of the invention will appear from the following description. In the description, reference is made to the accompanying drawings that form a part hereof, and in which there is shown by way of illustration, a preferred embodiment of the invention. Such embodiment does not necessarily represent the full scope of the invention, however, and reference must be made to the claims herein for interpreting the scope of the invention.

DETAILED DESCRIPTION OF THE INVENTION

Figure 1:
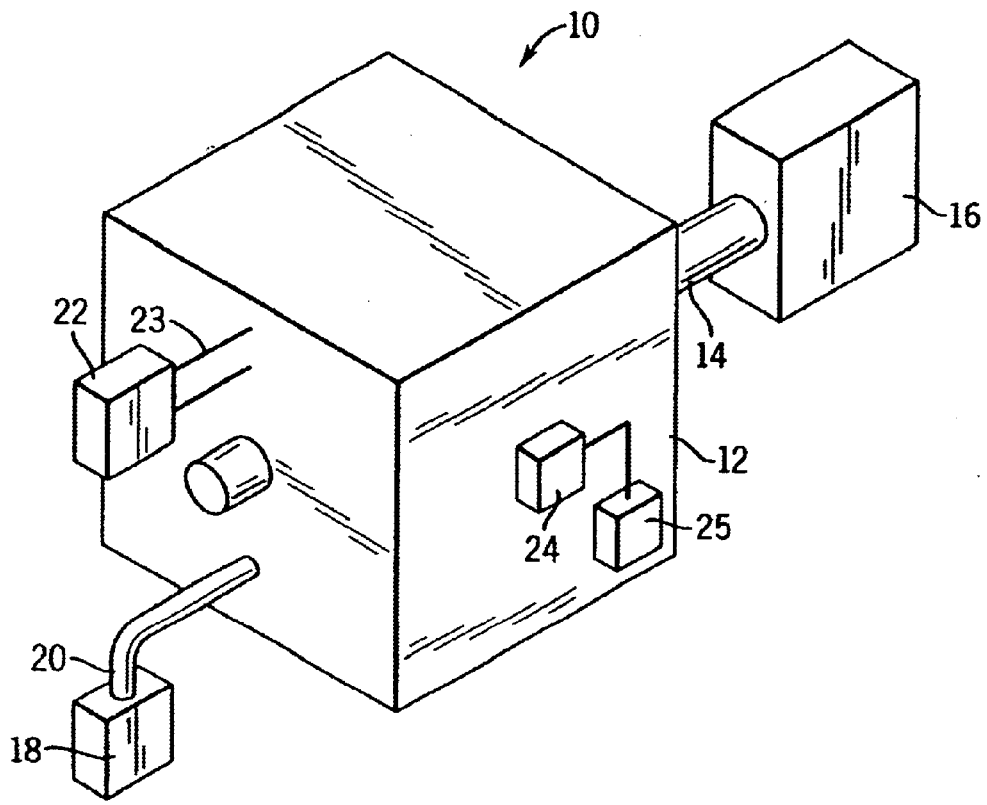
FIG. 1 is a simplified side view of the exterior of a motor as per the present invention showing a housing containing a stator and a rotor as well as heating and cooling devices and a power source for a stator winding.
Figure 12:
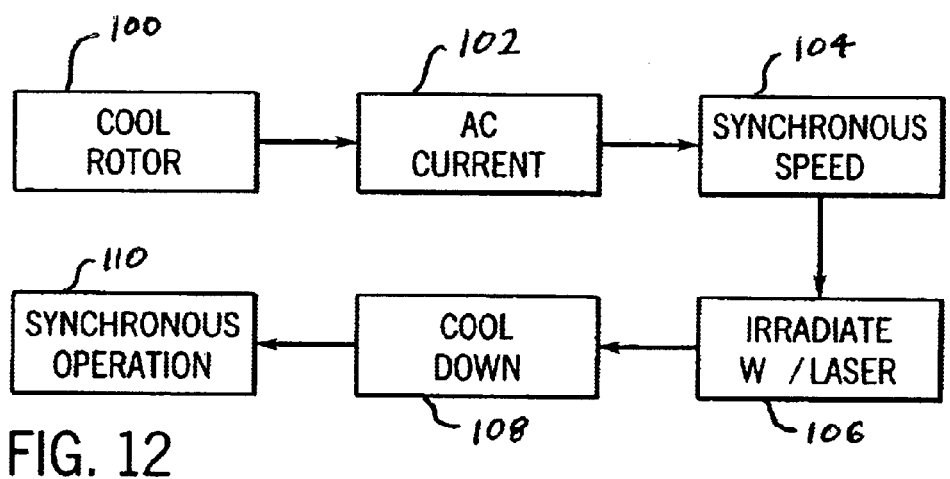
FIG. 12 is a flowchart depicting the steps involved in the operation of the present invention.

Referring now to FIG. 1, the present invention is an electric motor 10 connected via a shaft 14 to a machine 16 for which the motor 10 provides mechanical torque. The shaft 14 penetrates, at one or both ends, a housing 12 that surrounds the motor. External to the housing 12 are a current source 22 to supply AC current through a wire 23 to the stator (shown in FIG. 2) and a cooler 18 to supply coolant through a tube 20 to the rotor (shown in FIG. 2). In one embodiment of the present invention, a laser 24 penetrates the housing 12 perpendicular to the axis of the shaft 14. A power source 25 is connected to the laser 24 to provide power.

Figure 2:
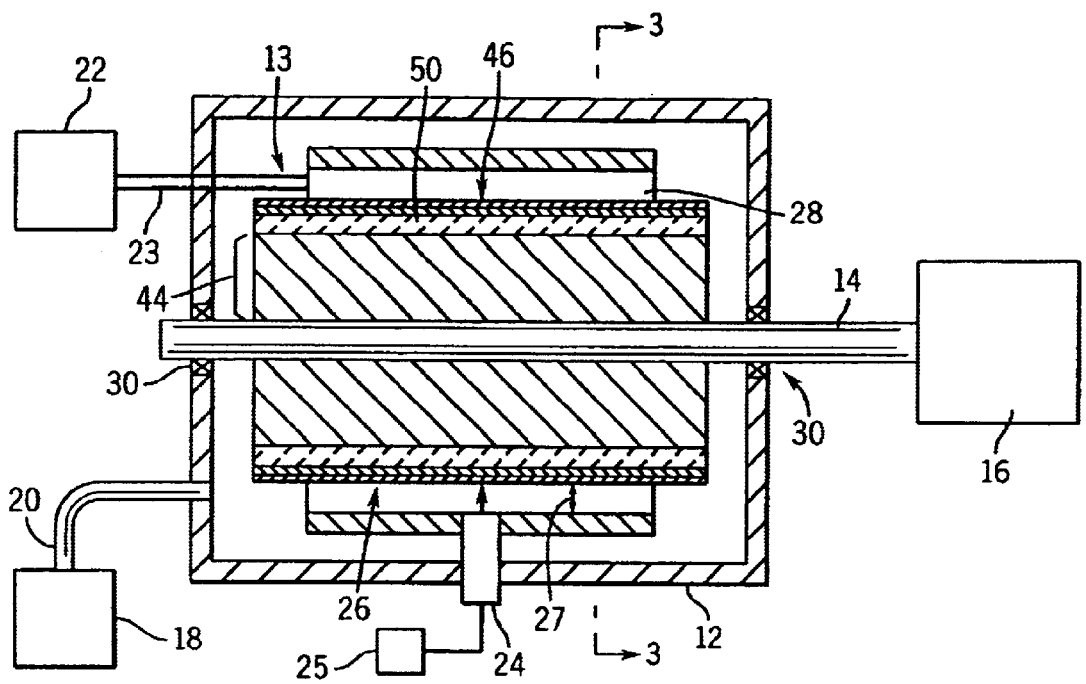
FIG. 2 is a longitudinal cross-sectional view of the present invention showing a cylindrical rotor located inside and coaxial with a cylindrical stator, both of which are contained within a housing with openings at both the left and right sides to allow the shaft of the rotor to penetrate the housing and connect to an external device to be supplied with mechanical torque from the rotor.

Referring now to FIGS. 1 and 2, the housing 12 encloses a cylindrical rotor 26, comprising the shaft 14, as well as layers of iron laminations 44 surrounding the shaft 14 in a cylindrical shape and a ceramic shell 50 that forms the outer portion of the cylindrical rotor 26. Deposited on the exterior of the ceramic shell 50 is thin film 46 of superconducting material as will be described in more detail below. A stator 28 in the shape of a hollow cylinder surrounds and is coaxial with the rotor 26. The stator 28 is comprised of a series of coil windings (not shown) in a conventional design. The central shaft 14 of the rotor 26 extends beyond the laminations 44 and the shell 50, and as described above, penetrates the housing 12 at one or both ends to connect with an external device 16. At the point(s) where the shaft 14 penetrates the housing 12, a bearing 30 allows the shaft 14 to rotate within the stationary housing 12 while preventing the coolant 13 enclosed by the housing 12 from escaping.

Figure 3:
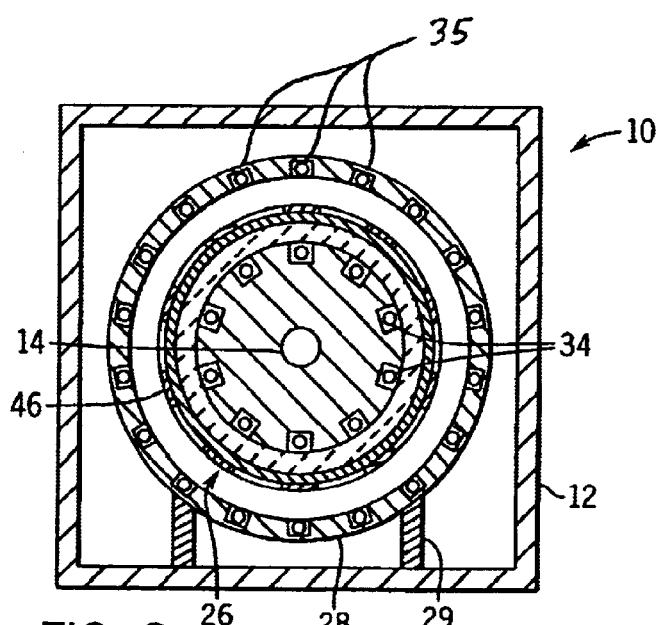
FIG. 3 is a transverse cross-sectional view of the present invention, taken along the line 2—2, FIG. 2, showing the orientation of the rotor within the stator.

Referring now to FIGS. 2 and 3, the stator 28 is attached to the bottom of the housing 12 by supports 29 so that the stator 28 remains stationary with respect to the housing 12. The rotor 26 is positioned within the stator 28 so that the rotor 26 is separated from the stator 28 by an air gap 27 of uniform thickness. The coils 34 of the auxiliary squirrel cage are parallel with the shaft 14 of the rotor 26 and with the stator coils 35.

Figure 4:
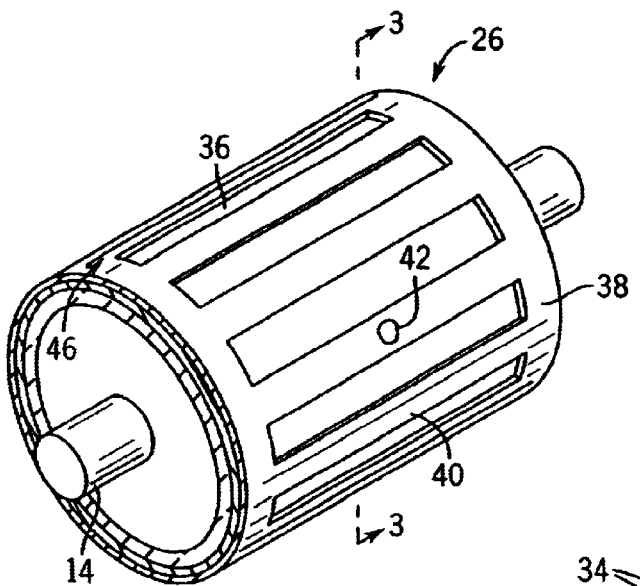
FIG. 4 is perspective side view of the rotor of FIG. 2 showing the squirrel cage configuration of the superconducting material and the portion of the material to be heated to provide a gap in the superconducting circuit.

Referring now to FIG. 4, the superconducting film 46 is deposited on the rotor 26 in a pattern that resembles a conventional squirrel cage. To achieve this pattern, the superconducting film 46 does not cover the entire outer surface of the rotor 26. Instead, cutouts 36, where no superconducting film 46 is deposited, are located on the outer surface of the rotor 26 running parallel to the axis of rotation of the central shaft 14. These cutouts 36 do not cover the entire length of the rotor 26, but instead extend on partially along the length of the rotor 26, leaving two rings 38 of superconducting film 46, one at each end of the rotor 26. These rings 38 extend around the entire circumference of the rotor 26 and provide a connection between the bars 40 of superconducting film 46 that are aligned parallel to the axis of the rotor 26 interspersed between the cutouts 36. This combination of end rings 38 and bars 40 of superconducting film 46 creates on the outer surface of the rotor 26 a configuration that resembles a conventional squirrel cage.

Figure 7:
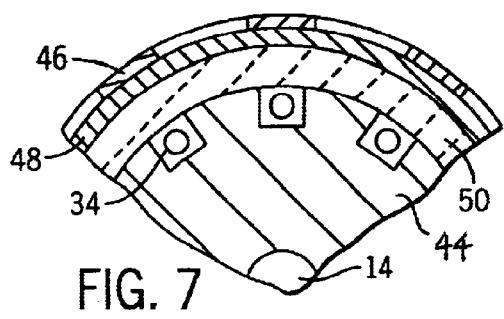
FIG. 7 is a detail view of a fragment of the rotor of FIG. 4, taken along the line 3—3, showing the bars of the auxiliary squirrel cage imbedded in iron laminations.

Referring now to FIGS. 4 and 7, the rotor 26 depicted in FIG. 4 contains a cylindrical central shaft 14. This central shaft plays no direct role in the transformation of electrical energy into mechanical energy, but instead is concerned with the transfer of the mechanical torque produced by the rotor. For this reason, the size and composition of the central shaft should be chosen to minimize its mass while providing sufficient strength to transfer the torque produced without flexing or twisting. Bonded to the shaft 14 around its circumference is a series of iron laminations 44. Imbedded in the laminations 44 parallel to the axis of the shaft 14 are the coils 34 of the auxiliary squirrel cage (not shown) as described above. Firmly bonded to the outer circumference of the iron laminations 44 is a ceramic shell 50. On the outer circumference of the shell 50 is a substrate 48 and a superconducting film 46. The substrate 48 supplies a bonding surface for the ceramic shell 50 that is compatible with the molecular structure of the superconducting film 46. In the preferred embodiment of the invention, the superconducting film 46 is composed of HTS material such as a Thallium-based compound, which provides a high critical current density, and the substrate 48 is composed of $ZrO_2$.

Figure 5:
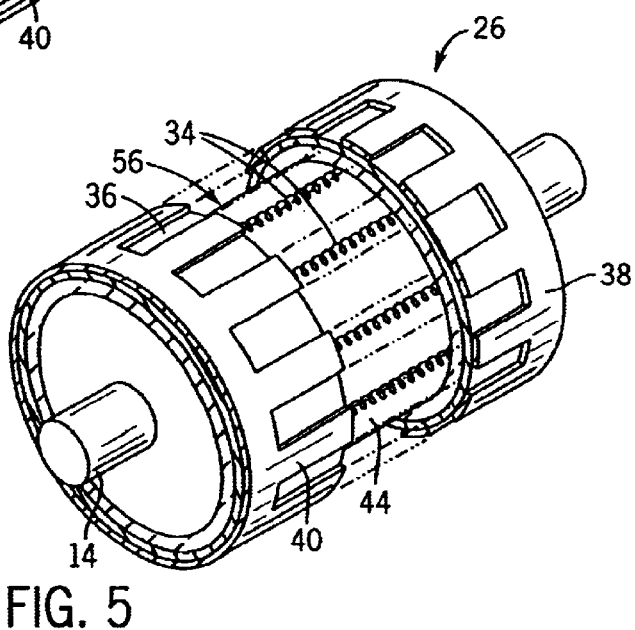
FIG. 5 is the same view as in FIG. 4, with a portion of the ceramic shell of the rotor removed to show an auxiliary squirrel cage of non-superconducting material.
Figure 6:
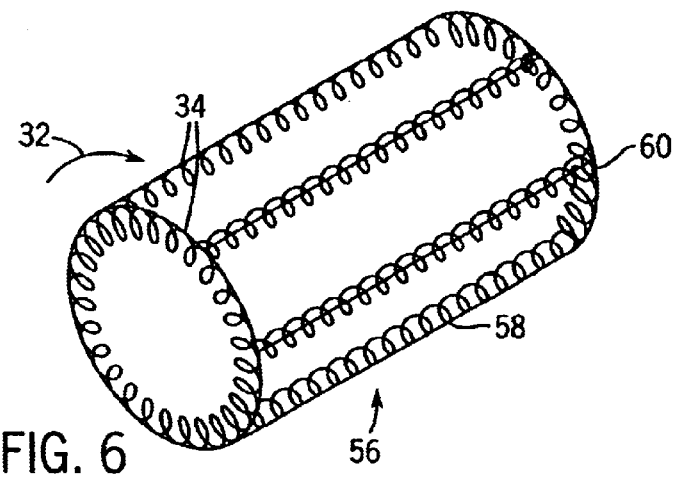
FIG. 6 is a perspective side view of the auxiliary squirrel cage removed from the ceramic shell.

Referring now to FIGS. 4, 5 and 6, the auxiliary squirrel cage 56 is imbedded in the iron laminations 44 of the rotor 26. The auxiliary squirrel cage 56 is comprised of coils 34 of non-superconducting material arranged into bars 58 parallel to the axis of rotation of the rotor 26 and end rings 60 that extend around the circumference of the iron laminations 44 and connect to the bars 58 of the auxiliary squirrel cage 56.

Figure 8:
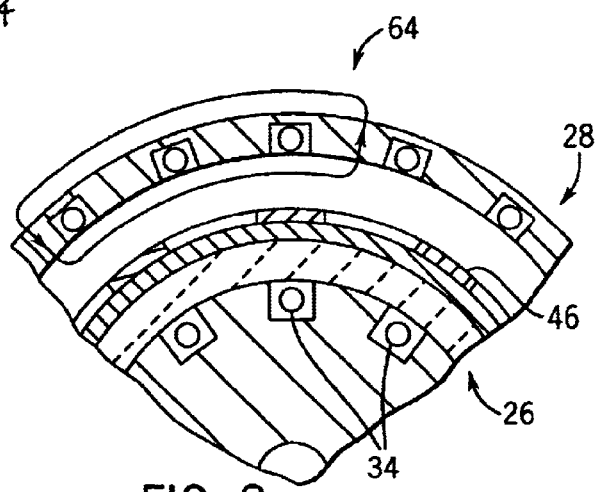
FIG. 8 is a simplified detailed view of the outer layer of the rotor of FIG. 4, showing how the magnetic flux lines generated by the stator cannot penetrate the thin film of superconducting material in its superconducting state.
Figure 9:
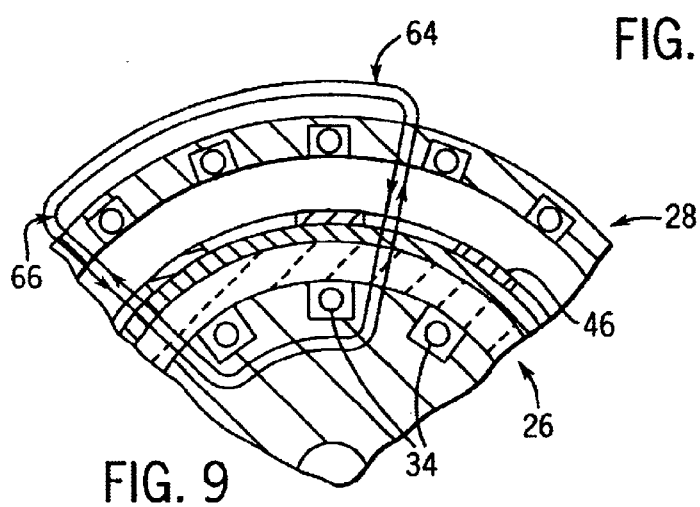
FIG. 9 is the same view as in FIG. 8, showing how the magnetic flux lines are able to penetrate superconducting material and induce a rotor current when the temperature of the superconducting film is above a critical temperature.

The operation of the motor 10 is summarized in FIGS. 8, 9, 10, 11, and 12. First, the rotor 26 is cooled to a temperature below a superconducting temperature. This is summarized at step 100. Once the rotor 26 is cooled so that the superconducting film 46 is in a superconducting state, the stator 28 is excited with an AC current, which generates a magnetic field that rotates around the stator 28 at a fixed speed and can be represented as a series of stator flux lines 64. This is summarized at step 102 in FIG. 12. As long as the superconducting film 46 is below a critical temperature and in a superconducting state, the stator flux lines 64 cannot penetrate the rotor 26 to reach the rotor coils 34 of the auxiliary squirrel cage 56 and the motor 10 cannot start. This state is depicted in FIG. 8.

In order to allow the stator flux lines 64 to penetrate the rotor 26 and induce a current in the auxiliary squirrel cage 56, a heated spot 42 is created on one of the bars 40 of the superconducting film 46. The heated spot 42 is heated sufficiently to raise the temperature of the superconducting film 46 to a temperature above its critical temperature so that portion of the superconducting film 46 is no longer superconducting. The heated spot 42 may be created by one several means for producing heat in a particular area. In the preferred embodiment, a laser 24, interposed within the stator 28 at a location such that the beam created by the laser is directed at the exterior of the rotor 26 at a point midway along the length of the cylindrical rotor 26, is pulsed on to irradiate the heated spot 42 sufficiently to raise its temperature above the critical temperature of the superconducting film 46. This is depicted in step 106 of FIG. 12.

The formation of a heated spot 42 acts as a "break" in the squirrel cage of superconducting film 46 and allows the stator flux lines 64 to penetrate the superconducting film 46 to induce a current in the auxiliary squirrel cage 56 in a manner well known in the art of induction motors. The induced current in the auxiliary squirrel cage 56 generates its own magnetic filed, which can be represented by a set of rotor flux lines 66. The rotor flux lines 66 interact with the stator flux lines 64 in a manner well known in the art to produce torque that allow the rotor 26 to rotate about its axis. This is shown on FIG. 9.

Figure 10:
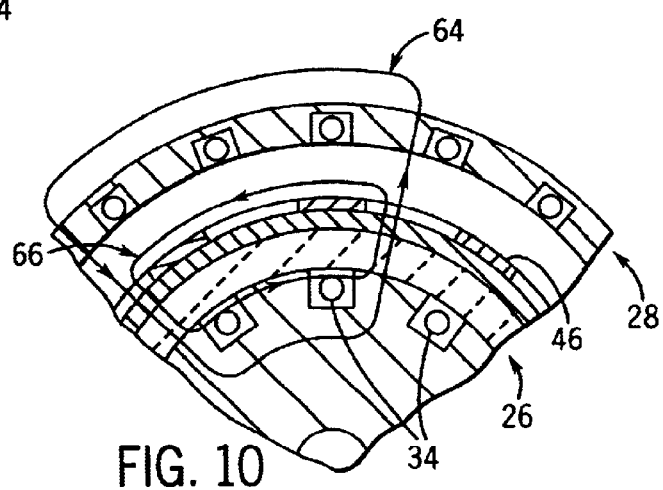
FIG. 10 is the same view as FIGS. 8 and 9, showing how the rotor current is trapped in the superconducting film.
Figure 11:
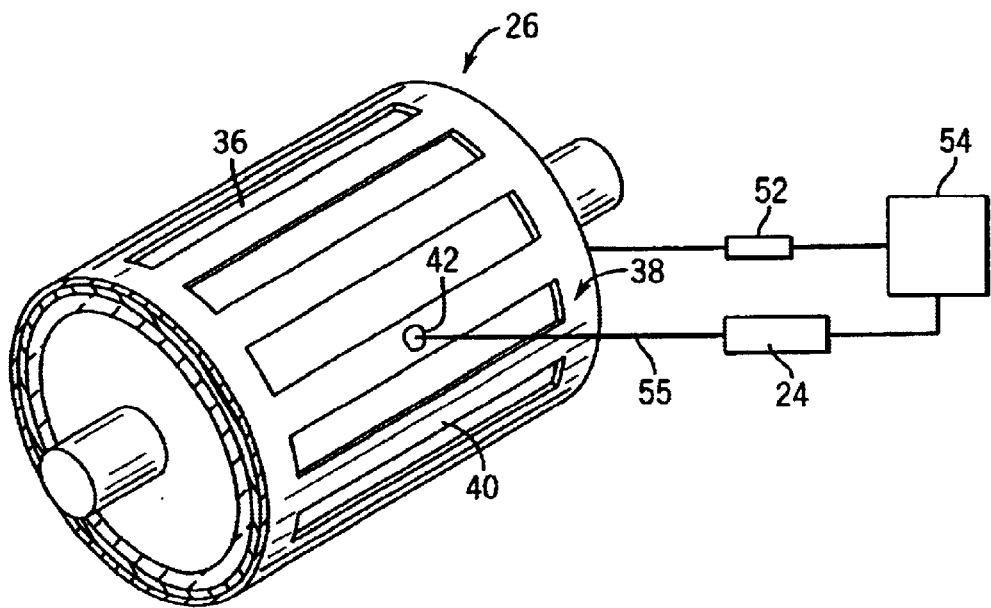
FIG. 11 is a schematic view of the rotor from FIG. 2 showing the heating mechanism consisting of a laser and its power source and controller.

As the rotor 26 reaches synchronous speed, the heated spot 42 is allowed to cool back down to a temperature below its critical temperature so that it once again becomes superconducting. This is depicted in step 108 of FIG. 12. As the heated spot 42 cools down, the squirrel cage formed on the surface of the rotor 26 by the superconducting film 46 forms a complete superconducting circuit. Since the resistance of the superconducting film 46 is lower that of the auxiliary squirrel cage 56, the induced current that was generated in the auxiliary squirrel cage 56 migrates to the superconducting film 46. The current is then trapped in the superconducting film 46, creating in effect a permanent magnet in the rotor 26 to generate rotor flux lines 66. This step is depicted in FIG. 10. Hereafter, the motor 10 operates as a traditional synchronous motor, with the "trapped" current in the superconducting film 46 on the surface of the rotor 26 acting as a permanent magnet. This is depicted in step 110 of FIG. 12.

Figure 13:
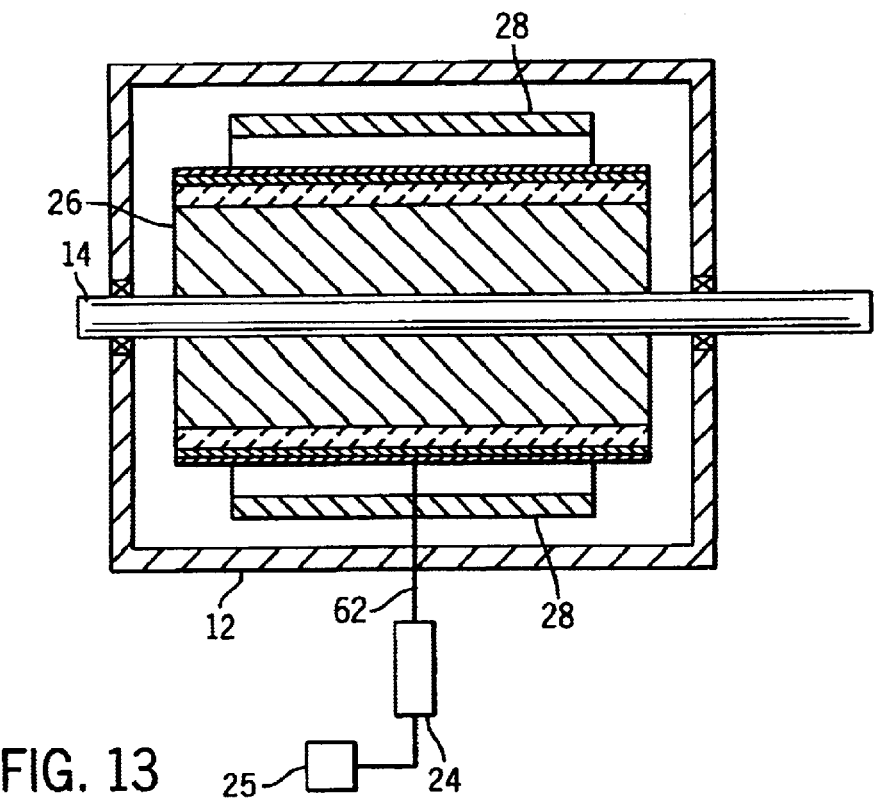
FIG. 13 is the same view as in FIG. 2, depicting an alternative embodiment of the invention where the laser is external to the housing and a fiber-optic cable penetrates the housing to deliver a laser beam to the stator.

Referring now to FIG. 13, an alternative embodiment of the invention has a laser 24 and its power source 25 located exterior to the housing 12. A fiber-optic cable 62 penetrates the housing 12 and the stator 28 at a point on the outer circumference of the stator 28. The fiber-optic cable 62 is perpendicular to the shaft 14 of the rotor 26 and is positioned so that a laser beam (not shown) is directed through the fiber-optic cable 62 to a point on the rotor 26.

What is claimed is:
1. An electric motor comprising:
   a) a stator having an armature winding to provide a stator field;
   b) a rotor positioned within the stator whose outer surface contains a thin film of superconducting material;
   c) an auxiliary coil communicating with the rotor to produce rotation in the rotor;
   d) a cooler to cool the superconducting material in the rotor to a temperature below a critical temperature of the superconducting material; and
   e) a heating device to raise the temperature of at least one portion of the superconducting material to a temperature above the critical temperature, wherein the at least one portion of the superconducting material is substantially less than all of the superconducting material.

2. The electric motor as in claim 1, further including an A/C drive connected to the stator and generating a magnetic field that rotates around the rotor at a fixed speed.

3. The electric motor as in claim 1, where the superconducting material is a Thallium-based compound.

4. The electric motor as in claim 1, where the rotor comprises an inner shaft and a ceramic shell on which the superconducting material is deposited.

5. The electric motor as in claim 1, where a substrate layer is placed between a ceramic shell and the superconducting film.

6. The electric motor as in claim 1, where a substrate layer comprises a compound of $ZrO_2$.

7. The electric motor as in claim 1, where the rotor contains a layer of iron laminations under a ceramic shell on which the superconducting material is deposited.

8. The electric motor as in claim 1, where the auxiliary coil comprises a squirrel-cage induction coil of a non-superconducting material.

9. The electric motor as in claim 8, where the squirrel-cage induction coil comprises a winding of non-superconducting wire within the stator field.

10. The electric motor as in claim 8, where the squirrel-cage winding is imbedded in iron laminations of the rotor.

11. The electric motor as in claim 1, where the heating device is a pulsed laser.

12. The electric motor as in claim 11, including a fiber-optic cable where the laser is external to the stator and the pulse is delivered to the rotor through the fiber-optic cable.

13. The electric motor as in claim 1, where the superconducting material is deposited on the rotor in a squirrel-cage configuration.

14. The electric motor as in claim 13, where the squirrel cage configuration includes a number of bars, running parallel to an axis of rotation of the rotor, that are joined at ends of the rotor by two rings around the circumference of the rotor.

15. The electric motor of claim 14, wherein the at least one portion of the superconducting material that is heated by the heating device is limited to at least one spot along at least one of the bars of the squirrel cage configuration.

16. A method of operating an electric motor, whose rotor is covered by a film of superconducting material, which comprises:
   a) cooling the superconducting material to a temperature below a critical temperature;
   b) exciting an armature winding in a stator coil to produce a rotating magnetic field;

c) inducing a current in an auxiliary induction coil to produce rotation in the rotor;

d) heating at least one portion of the superconducting material above the critical temperature to allow the rotating magnetic field to penetrate the superconducting material and produce a direct current in the superconducting material, wherein the at least one portion of the superconducting material is substantially less than all of the superconducting material;

e) allowing the heated portion of the superconducting material to cool to below the critical temperature once the rotation of the rotor has reached a synchronous speed to trap the direct current in the superconducting material; and f) operating the motor as a synchronous motor using the trapped direct current in the superconducting material to create a magnetic field in the rotor that interacts with the rotating magnetic field generated by the stator to create mechanical torque.

17. The method as in claim 16, where the means for heating portions of the superconducting material comprises irradiating the portions with a pulsating laser.

18. An electric machine comprising:

a) a stator having a winding to provide a stator field;

b) a rotor positioned within the stator, wherein an outer surface of the rotor is formed from superconducting material; and c) means for heating a limited portion of the superconducting material above a critical temperature while a remainder of the superconducting material remains below the critical temperature, wherein a current is induced within the superconducting material during a time when the limited portion is heated above the critical temperature and the remainder is below the critical temperature.

19. The electric machine of claim 18, wherein the limited portion of the superconducting material is a substantially smaller amount of the superconducting material than the remainder.

20. The electric machine of claim 18, wherein the superconducting material is a thin film.

* * * * *